(12) United States Patent
Nakamura et al.

(10) Patent No.: US 8,612,116 B2
(45) Date of Patent: Dec. 17, 2013

(54) THROTTLE CONTROL SYSTEM (75) Inventors: Masanori Nakamura, Wako (JP); Yukihiro Asada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 845 days.

(21) Appl. No.: 12/719,968

(22) Filed: Mar. 9, 2010

(65) Prior Publication Data
US 2010/0242907 A1    Sep. 30, 2010

(30) Foreign Application Priority Data
Mar. 31, 2009    (JP) .................................. 2009-086063

(51) Int. Cl.
B60T 7/12       (2006.01)
G05D 1/00       (2006.01)
G06F 7/00       (2006.01)
G06F 17/00      (2006.01)
G06F 19/00      (2011.01)
G06G 7/70       (2006.01)
F02D 41/00      (2006.01)
F02D 11/10      (2006.01)
F02D 9/08       (2006.01)

(52) U.S. Cl.
USPC ........... 701/103; 701/110; 123/361; 123/399; 123/403

(58) Field of Classification Search
USPC ......... 123/320, 324, 361, 396, 398, 399, 403; 701/102, 103, 110
See application file for complete search history.

(56) References Cited

U.S. PATENT DOCUMENTS

| | | | | |
|---|---|---|---|---|
| 5,018,496 A | * | 5/1991 | Buchl | 123/399 |
| 6,766,785 B2 | * | 7/2004 | Ishida et al. | 123/399 |
| 7,156,074 B2 | * | 1/2007 | Hanasato | 123/399 |
| 7,571,710 B2 | * | 8/2009 | Fukami et al. | 123/342 |

FOREIGN PATENT DOCUMENTS

| | | |
|---|---|---|
| DE | 43 03 560 A1 | 8/1994 |
| EP | 0 992 662 A2 | 4/2000 |
| EP | 1 308 615 A2 | 5/2003 |
| EP | 1 533 497 A1 | 5/2005 |
| JP | 08-074639 | 3/1996 |

OTHER PUBLICATIONS

European Search Report application No. 10154225.6-2311 dated May 11, 2010.

* cited by examiner

*Primary Examiner* — Stephen K Cronin
*Assistant Examiner* — Sherman Manley
(74) *Attorney, Agent, or Firm* — Squire Sanders (US) LLP (57) ABSTRACT

A target TH opening degree change amount calculating unit 26 calculates a change amount of a target throttle opening degree ΔTHCMD. In accordance with whether or not the change amount of the target throttle opening degree ΔTHCMD is not less than a predetermined control start threshold, a collision prevention process determining unit 27 determines whether a throttle grip 21 has been operated to rapidly close. When the rapid closing operation of the throttle grip 21 is detected, a change-amount basic value calculating unit 28 calculates a change-amount basic value of the target throttle opening degree. A correction term calculating unit 29 inputs to a multiplying unit 30 a correction term for correcting the change-amount basic value. The multiplying unit 30 multiplies the change-amount basic value by the correction term, and outputs a change amount of the target throttle opening degree thus calculated. The correction term can be set, for example, to have a value not more than 1.0 in accordance with the target TH opening degree.

8 Claims, 6 Drawing Sheets

25 TARGET TH OPENING DEGREE CALCULATING UNIT
26 TARGET TH OPENING DEGREE CHANGE AMOUNT CALCULATING UNIT
27 COLLISION PREVENTION PROCESS DETERMINING UNIT
28 CHANGE-AMOUNT BASIC VALUE CALCULATING UNIT

FIG. 1

25 TARGET TH OPENING DEGREE CALCULATING UNIT
26 TARGET TH OPENING DEGREE CHANGE AMOUNT CALCULATING UNIT
27 COLLISION PREVENTION PROCESS DETERMINING UNIT
28 CHANGE-AMOUNT BASIC VALUE CALCULATING UNIT

THROTTLE CONTROL SYSTEM

BACKGROUND

1. Field

Embodiments of the present invention relate to a throttle control system. More specifically, examples of the invention relate to a throttle control system favorably employed, for instance, in a throttle-by-wire system. The system can prevent a valve gear connected to a throttle valve from colliding with a full-close stopper in the driving of the throttle valve in a closing direction.

2. Description of the Related Art

A conventional throttle control system for a throttle-by-wire (TBW) system detects the operation angle of a throttle grip, and controls the opening and closing of a throttle valve by driving a drive motor of the throttle valve in accordance with the operation opening degree.

In the throttle control by TBW, when the throttle valve is moved from a near fully or fully opened position to a fully closed position, the throttle valve sometimes collides at a high speed with a stopper that limits the fully closed position of the throttle valve. Against this problem, Japanese Patent Application Publication No. Hei 8-74639 (JP '639) describes a throttle control system configured as follows to avoid the throttle valve from colliding with the full-close stopper. Specifically, JP '639 discusses a throttle control system that gradually decreases a fully-closed limiter position toward a fully closed position when an actual opening degree of the throttle valve exceeds a predetermined opening degree in a fully closing direction. The predetermined opening degree being slightly shifted in an opening direction from the fully closed position.

The throttle control system described in JP '639 is to avoid the throttle valve from colliding with the stopper. However, since the throttle control system is designed to gradually move the fully-closed limiter position toward the fully closed position, the moving speed of the throttle valve does not change. For this reason, when the throttle valve is operated in a rapidly closing manner by a throttle operating device, the movement of the fully-closed limiter position may sometimes fail to follow the rapid closing operation on the throttle valve.

SUMMARY

Embodiments of the present invention provide a throttle control system that is capable of preventing overshoot in a throttle fully closing operation. Additionally, aspects of the throttle control system prevent deformation and abrasion of a full-close stopper, a throttle valve drive gear, and similar, from occurring.

One embodiment of the present invention includes a throttle control system for a TBW system in which a target throttle opening degree is calculated in accordance with an operation opening degree of a throttle operating device. A throttle valve is driven by a motor in accordance with the target throttle opening degree. The throttle control system performs a throttle valve control at a time of rapid closing operation of the throttle valve. The throttle valve is provided to a throttle body having a full-close stopper defining a fully closed position of the throttle valve. The throttle control system includes a target throttle opening degree change amount calculating unit configured to calculate a change amount of the target throttle opening degree on the basis of a difference between a calculated value of the target throttle opening degree at the last time and a calculated value of the target throttle opening degree at this time when the throttle operating device is operated in such a direction that the throttle valve is closed. In the throttle control system, when the target throttle opening degree is not more than a predetermined value and when the change amount of the target throttle opening degree becomes not less than a predetermined control start threshold, a limitation is provided on the change amount of the target throttle opening degree. For example, the change amount of the target throttle opening degree is set to be smaller than a predetermined normal change amount of the target throttle opening degree.

In addition, according to an embodiment, the limitation on the change amount of the target throttle opening degree is made using a correction term according to the target throttle opening degree. A product of the correction term and a change-amount basic value of the target throttle opening degree set for an individual target throttle opening degree is set as the change amount of the target throttle opening degree, so that the change amount of the target throttle opening degree is set to be lower than the normal change amount of the target throttle opening degree.

Moreover, in another embodiment, the limitation made on the change amount of the target throttle opening degree is maintained until a time point when the change amount of the target throttle opening degree falls below a predetermined control termination threshold.

Furthermore, according to another embodiment, after a limitation process on the change amount of the target throttle opening degree is terminated, the change amount of the target throttle opening degree is converged to an idling opening degree.

Other embodiments of the invention may include a method for controlling a throttle. The method includes performing a throttle valve control at a time of rapid closing operation of the throttle valve. The throttle valve provided to a throttle body having a full-close stopper defining a fully closed position of the throttle valve. The method may further include calculating a change amount of a target throttle opening degree. The target throttle opening degree is calculated in accordance with an operation opening degree of a throttle operating device, and a throttle valve is driven by a motor in accordance with the target throttle opening degree. The calculating includes calculating the change amount of the target throttle opening degree on the basis of a difference between a calculated value of the target throttle opening degree at the last time and a calculated value of the target throttle opening degree at this time when the throttle operating device is operated in such a direction that the throttle valve is closed. When the target throttle opening degree is not more than a predetermined value and when the change amount of the target throttle opening degree becomes not less than a predetermined control start threshold, providing a limitation on the change amount of the target throttle opening degree, so that the change amount of the target throttle opening degree is set to be smaller than a predetermined normal change amount of the target throttle opening degree.

Another embodiment of the invention include a throttle control system. The throttle control system may include a performing unit configured to perform a throttle valve control at a time of rapid closing operation of the throttle valve. The throttle valve is provided to a throttle body having a full-close stopper defining a fully closed position of the throttle valve. The throttle control system further includes a calculating unit configured to calculate a change amount of a target throttle opening degree. The target throttle opening degree is calculated in accordance with an operation opening degree of a throttle operating device, and a throttle valve is driven by a motor in accordance with the target throttle opening degree.

The calculating unit is further configured to calculate the change amount of the target throttle opening degree on the basis of a difference between a calculated value of the target throttle opening degree at the last time and a calculated value of the target throttle opening degree at this time when the throttle operating device is operated in such a direction that the throttle valve is closed. When the target throttle opening degree is not more than a predetermined value and when the change amount of the target throttle opening degree becomes not less than a predetermined control start threshold, a providing unit is configured to provide a limitation on the change amount of the target throttle opening degree, so that the change amount of the target throttle opening degree is set to be smaller than a predetermined normal change amount of the target throttle opening degree.

DETAILED DESCRIPTION

Figure 2:
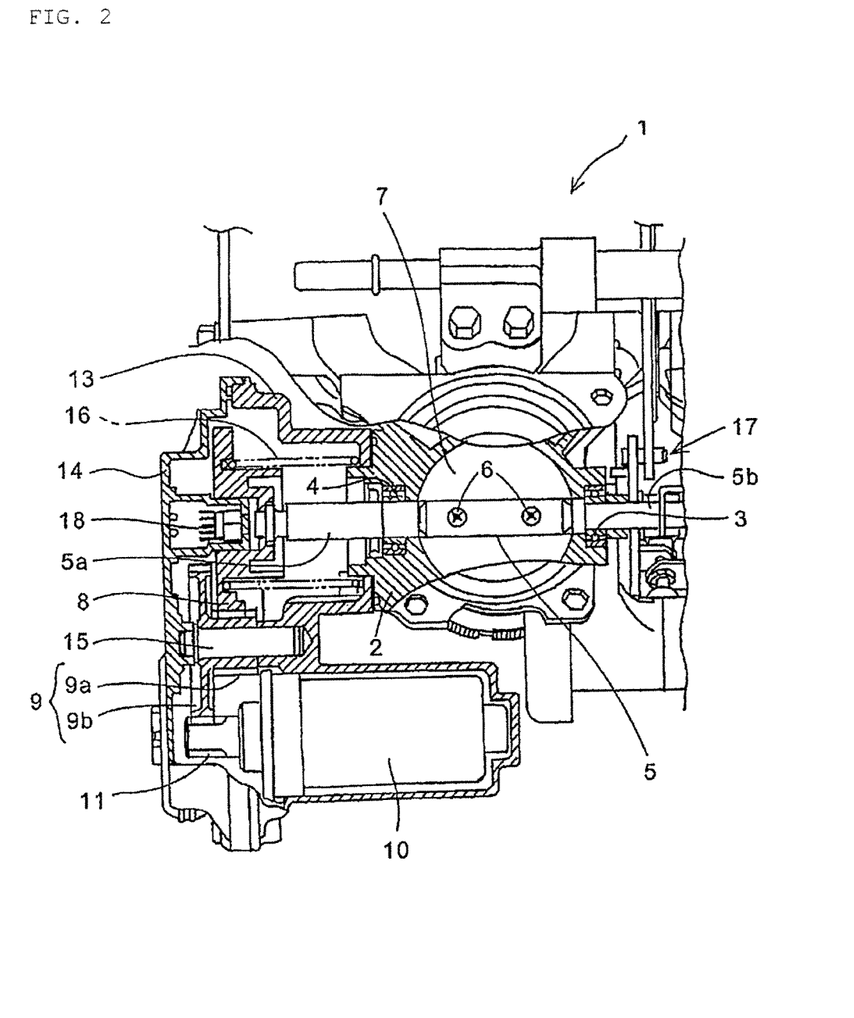
FIG. 2 is a cross-sectional view of a throttle body for which the throttle control system according to an embodiment of the present invention is employed.
Figure 3:
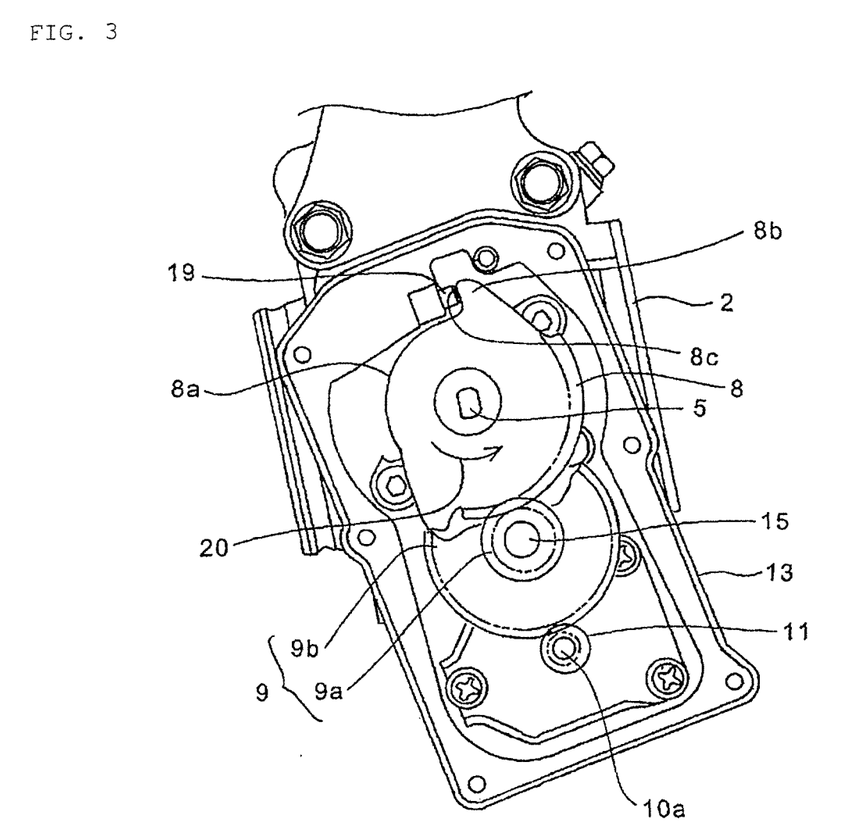
FIG. 3 is a side view of the throttle body in a state where a cover is removed from the throttle body.

Embodiments of the present invention will be described with reference to the drawings. FIG. 2 is a cross-sectional view of a throttle body that is controlled by a throttle control system according to one embodiment of the present invention. FIG. 3 is a side view of the throttle body with a cover removed from the throttle body.

According to certain embodiments, a throttle body 1 includes a throttle shaft 5 supported by bearings 3 and 4 on a wall portion 2 of an intake pipe of an engine. A throttle valve 7 is attached to the throttle shaft 5 by use of locking screws 6, 6. The throttle shaft 5 protrudes leftward from the bearing 4 in FIG. 2. A partial gear serving as a final-stage gear 8 constituting a drive system is connected to a protruding portion 5a of the throttle shaft 5. The final-stage gear 8 meshes with a small gear 9a of an intermediate gear 9, and a large gear 9b of the intermediate gear 9 meshes with an output gear 11 attached to an output shaft 10a of a motor 10.

A drive system case 12 can be formed of a case main body 13 that is connected to the wall portion 2 of the intake pipe and a cover 14 that covers the case main body 13 from the left side in FIG. 2. The drive system case 12 may house the output gear 11 and the motor 10 as well as the intermediate gear 9 and the final-stage gear 8.

In some embodiments, the intermediate gear 9 is rotatably supported on a gear shaft 15 that is supported at both ends thereof by the case main body 13 and the cover 14, respectively. A return spring 16 (such as a coil spring) is disposed between the final-stage gear 8 and the case main body 13. One end of the coil of the return spring 16 is locked with the final-stage gear 8 and the other end thereof is locked with the case main body 13. In this state, the return spring 16 is twisted in such a manner as to bias the throttle valve 7 in a fully closing direction.

The throttle shaft 5 can also have a portion 5b that protrudes from the bearing 3 on the right side in FIG. 2. The protruding portion 5b has a link mechanism 17 with which the throttle shaft 5 is linked with a throttle shaft (not illustrated) of a throttle valve provided in another cylinder.

In one embodiment, a throttle position sensor (TPS) 18 is provided between the final-stage gear 8 and the cover 14. The TPS 18 includes a sensor IC incorporating a magneto-resistive element, and a TPS as described in Japanese Patent Application Publication No. 2008-298083 can be used.

In one example, the final-stage gear 8 has a small-diameter portion 8a and a stopper engagement portion 8b as shown in FIG. 3. The small-diameter portion 8a is formed in a part with no tooth formed therein of the final-stage gear 8. The stopper engagement portion 8b rises up from the small-diameter portion 8a in a circumferential direction of the final-stage gear 8. A full-close stopper is fixed to the case main body 13. The stopper engagement portion 8b comes into contact with the full-close stopper 19 at the throttle fully closed state. A rising up surface 8c of the stopper engagement portion 8b is a surface that comes into contact with the full-close stopper 19 when the final-stage gear 8 rotating in a throttle closing direction 20 arrives at a fully closed position.

With the above-described structure, when an unillustrated throttle operating device is operated in a throttle opening direction, the motor 10 is driven in accordance with the operation amount (or, the operation opening degree). The motor 10 thereby rotates the final-stage gear 8 in a direction opposite to the arrow 20 so that the throttle valve 7 should be opened. On the other hand, when the throttle operating device is operated in a throttle closing direction, the motor 10 is driven in accordance with the operation amount (or, the operation opening degree) and the final-stage gear 8 is rotated in the direction of the arrow 20 so that the throttle valve 7 should be closed.

Figure 4:
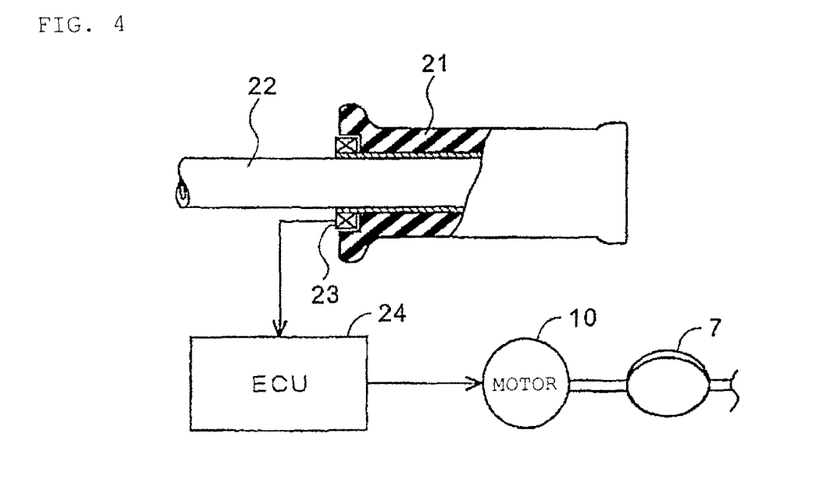
FIG. 4 is a system configuration diagram of the throttle control system according to one embodiment of the present invention.

FIG. 4 is a system configuration diagram of a throttle control system that drives the motor 10, according to one embodiment. In FIG. 4, a throttle grip 21 serving as the throttle operating device is provided, for example, on a steering handlebar 22 of a motorcycle. A grip sensor that detects the operation opening degree of the throttle grip 21 is provided to the steering handlebar 22. The grip sensor 23 inputs a detection signal indicating the operation opening degree to an ECU 24 including a microcomputer. The ECU 24 calculates a target throttle opening degree on the basis of the detection signal indicating the operation opening degree, and applies the motor 10 with the number of steps according to the target throttle opening degree, so that the throttle valve 7 is rotated to the target throttle opening degree.

When the throttle valve 7 is to be opened, the number of steps is determined on the basis of the detection signal indicating the operation opening degree of the throttle grip 21. On the other hand, when the throttle valve 7 is to be closed, the number of steps is determined by multiplying a change-amount basic value of the target throttle opening degree by a correction term, so that the displacement rate of the throttle valve 7 is lowered. Here, the change-amount basic value of the target throttle opening degree is set for each target throttle opening degree.

Figure 5:
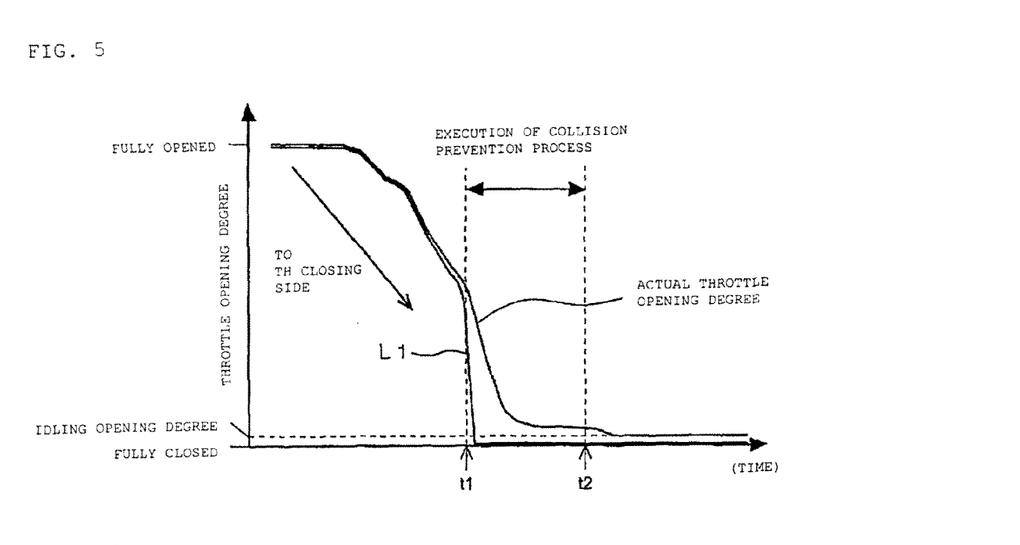
FIG. 5 is a conceptual diagram showing an operation to close a throttle valve.

FIG. 5 is a conceptual diagram, according to one embodiment, showing an operation when the throttle valve 7 is to be closed. In FIG. 5, the lateral axis is a time axis, and the vertical axis is the throttle opening degree. The target throttle opening degree THCMD is calculated on the basis of the operation opening degree of the throttle grip 21. Thereby, an actual throttle opening degree is controlled.

Consider the case where the throttle grip 21 is operated in the throttle closing direction. In this case, if the throttle grip 21 is operated to rapidly close, the change amount of the target throttle opening degree THCMD becomes larger than that in the normal throttle closing operation. Then, if the throttle valve 7 is closed with the target throttle opening degree being maintained with such a large change amount, an overshoot occurs as will be described later with reference to FIG. 9. As a result, the stopper engagement portion 8b of the final-stage gear 8 may collide with the full-close stopper 19.

In this regard, a collision prevention process is performed in this embodiment. In the collision prevention process, the throttle valve 7 is closed while the change amount of the opening degree per unit time is limited by use of a change amount of the target throttle opening degree obtained through multiplication by the correction term. Specifically, the collision prevention process is started at a time point t1 when the opening degree of the throttle grip 21 is changed in a rapid-closing manner. In the collision prevention process, the correction term for the change-amount basic value of the target throttle opening degree is determined in accordance with the target throttle opening degree (the number of steps applied to the motor 10) at the time point t1. The basic value is multiplied by the correction term thus determined. The larger the target throttle opening degree is (that is, the larger the change amount of the throttle opening degree from a current position to an idling position), the larger value the correction term is set at. On the other hand, the smaller the target throttle opening degree is, the smaller the correction term is set at. In this embodiment, the maximum value of the correction term is "1.0." Accordingly, as the throttle valve 7 comes closer to the fully closed position, the change amount of the target throttle opening degree becomes smaller. In turn, the rotating speed of the throttle valve 7 in the closing direction becomes smaller.

At a time point when the change amount of the target throttle opening degree becomes not more than a predetermined value (for example, at a timing t2), the collision prevention process is terminated. Then, the throttle opening degree is converged to the idling opening degree with the correction term retained.

Figure 1:
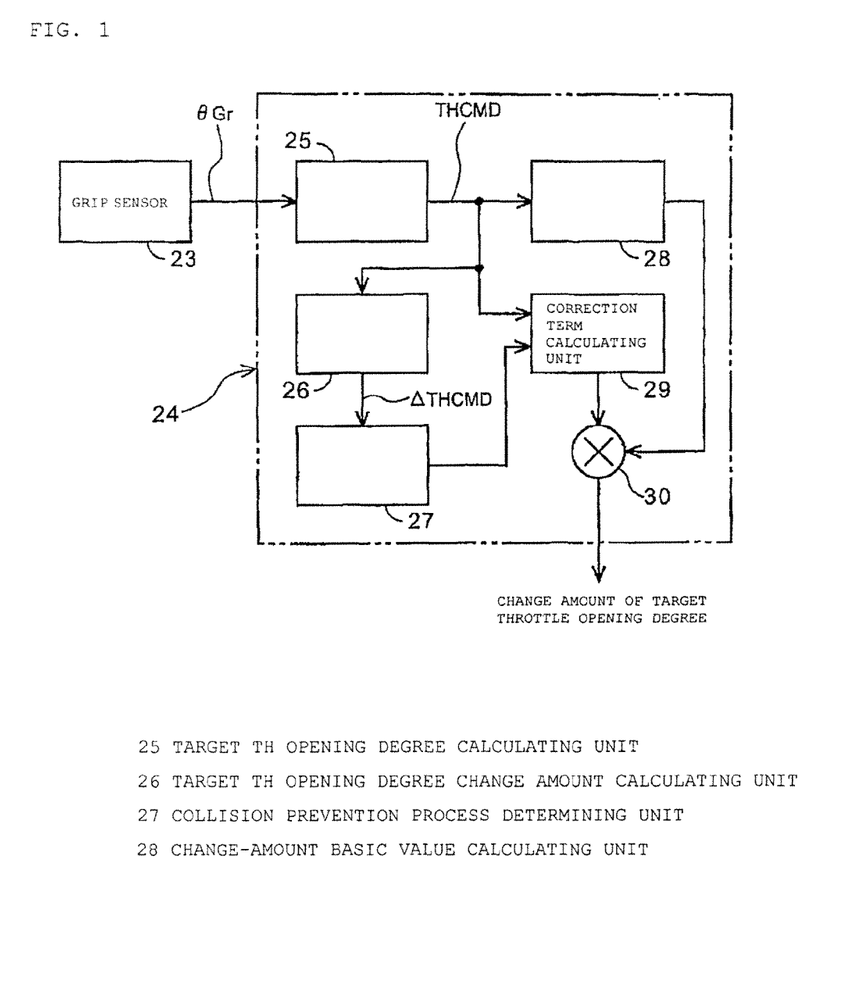
FIG. 1 is a block diagram showing some functions of certain parts of a throttle control system according to an embodiment of the present invention.

FIG. 1 is a block diagram showing the functions of the units of the ECU 24, according to one embodiment. In the example of FIG. 1, a target throttle (TH) opening degree calculating unit 25 calculates a target throttle opening degree THCMD on the basis of an operation opening degree θGr. The operation opening degree θGr inputted to the opening degree calculating unit 25 from the grip sensor at each predetermined cycle of process. A target throttle (TH) opening degree change amount calculating unit 26 calculates a difference (a change amount of the target throttle opening degree) ΔTHCMD between the target throttle opening degree calculated at the last time and the target throttle opening degree calculated at this time.

When the target throttle opening degree is not more than a predetermined value (for example, when the amount of rotation of the throttle valve 7 to the fully closed position has become relatively small), a collision prevention process determining unit 27 determines whether the change amount of the target throttle opening degree ΔTHCMD is not less than a predetermined control start threshold (for example, whether or not the throttle grip 21 has been operated to rapidly close). When it is determined that the throttle grip 21 has been operated to rapidly close, the collision prevention process determining unit 27 inputs a collision prevention process signal to a correction term calculating unit 29.

A change-amount basic value calculating unit 28 reads the target throttle opening degree THCMD from the target throttle (TH) opening degree calculating unit 25. The change-amount basic value calculating unit 28 calculates a change-amount basic value of the target throttle opening degree, the basic value corresponding to the target throttle opening degree THCMD. The change-amount basic value may be determined by searching therefor a change-amount basic value map shown in FIG. 6.

Upon receipt of the collision prevention process signal, the correction term calculating unit 29 calculates a correction term used for correcting the change-amount basic value, and inputs the correction term thus calculated to a multiplying unit 30. The correction term for the change-amount basic value may be determined, for example, by searching a correction term map shown in FIG. 7, in accordance with the target throttle opening degree THCMD.

The change-amount basic value is also inputted to the multiplying unit 30, which then multiplies the change-amount basic value by the correction term. The multiplying unit outputs a change amount of the target throttle opening degree thus obtained.

When the change amount of the target throttle opening degree ΔTHCMD falls below a predetermined control termination threshold, the collision prevention process determining unit 27 turns off the collision prevention process signal. Once the collision prevention process signal is turned off, the correction term calculating unit 29 retains the correction term at this time. Accordingly, the change amount of the target throttle opening degree is maintained at a constant value.

In some embodiments, the control start threshold and the control termination threshold used by the collision prevention process determining unit 27 to determine whether to start and terminate the process, can be set for each target throttle opening degree in advance. Specifically, when the target throttle opening degree is large, the control start threshold is set at a large value. When the target throttle opening degree is small, the control start threshold is set at a small value. Accordingly, when the throttle grip 21 is operated to rapidly close from a position near the fully closed position, the collision prevention process to limit the change amount of the opening degree is started even with the rapid closing operation of a relatively small degree. However, if the target throttle opening degree of the throttle valve 7 in the closing direction is large, the configuration can keep the limitation on the change amount of the target throttle opening degree from starting.

Figure 6:
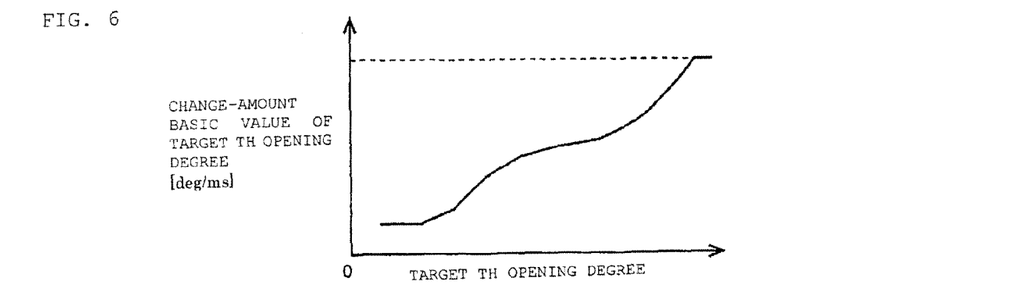
FIG. 6 is a map showing a change-amount basic value of a target throttle opening degree with respect to the target throttle opening degree.

FIG. 6 is a graph showing an example of the change-amount basic value map. In FIG. 6, the lateral axis is the target throttle opening degree THCMD, and the vertical axis is the change-amount basic value (°/millisecond). As shown in FIG. 6, the change-amount basic value is set as follows. Specifically, when the target throttle opening degree THCMD is large, the change-amount basic value is large. As the target throttle opening degree THCMD decreases, the change-amount basic value decreases.

Figure 7:
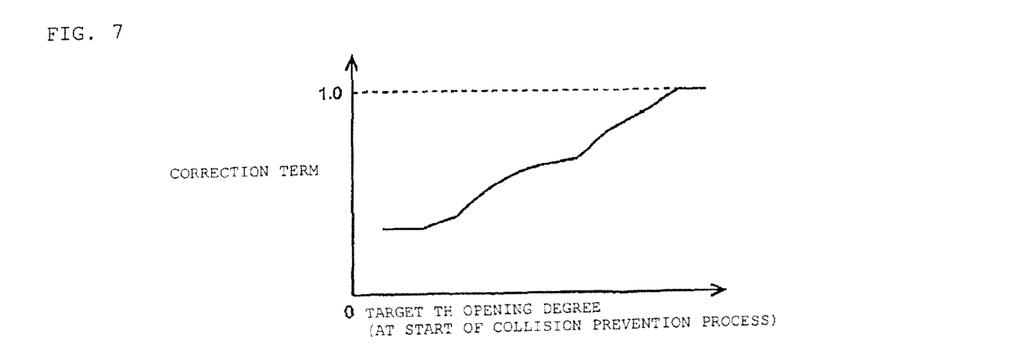
FIG. 7 is a map showing a correction term for the change amount of the target throttle opening degree with respect to the target throttle opening degree.

FIG. 7 is a graph showing an example of the correction term map. In FIG. 7, the lateral axis is the target throttle opening degree THCMD, and the vertical axis is the correction term. The maximum value of the correction term is "1.0."

Figure 8:
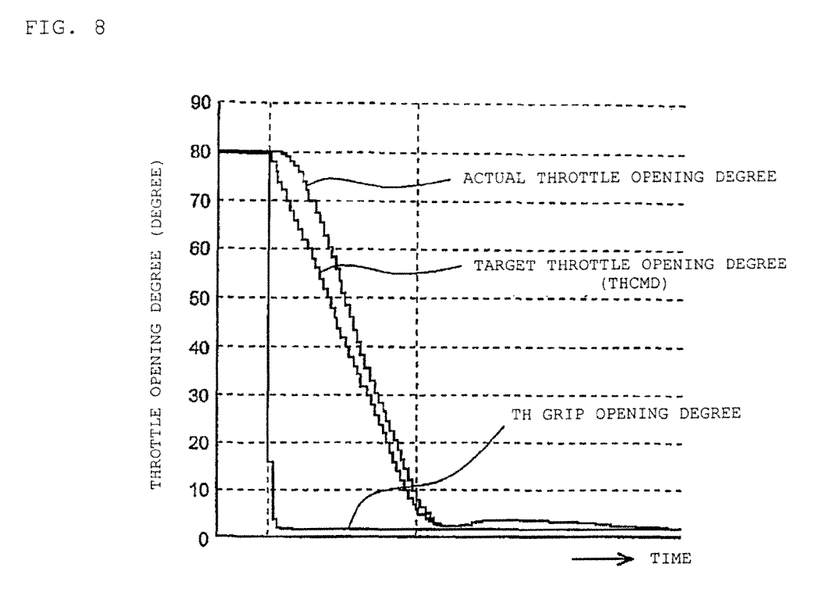
FIG. 8 is a graph showing a result of a control test confirming the effects obtained by the control system according to one embodiment of the present invention.
Figure 9:
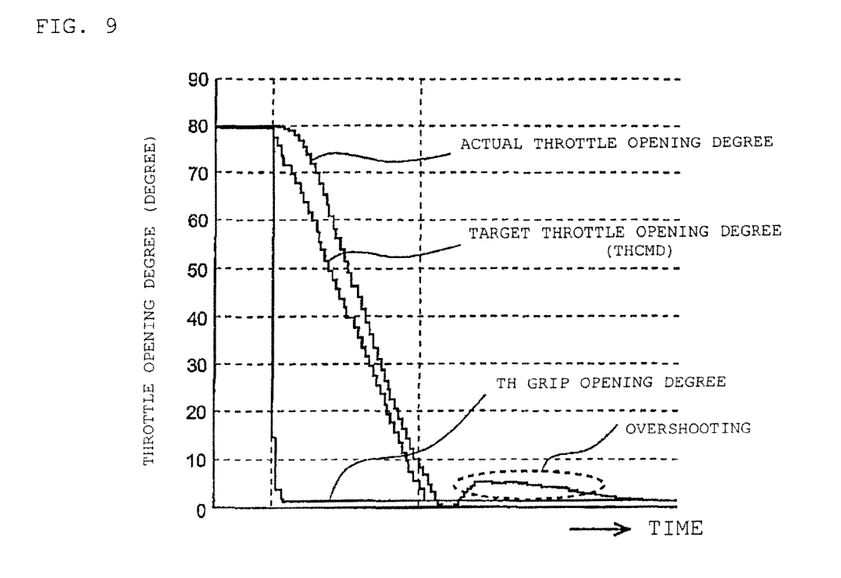
FIG. 9 is a graph showing a result of a control test using a conventional control system.

FIG. 8 shows a result of a control test with which the effects obtained by embodiments of the control system were confirmed. For comparison, FIG. 9 shows a result of a control test using a conventional control system. In FIG. 9, in the conventional system that does not perform the collision prevention process, even when the target throttle opening degree is changed, the change amount of the target throttle opening degree remains to be the basic value corresponding to the target throttle opening degree. In other words, since the rate of change in the throttle opening degree is large, the throttle valve 7 overshoots in the fully closing direction. The stopper engagement portion 8b of the final-stage gear 8 thus collides with the full-close stopper 19, and in turn, is displaced in a direction to open. After that, the throttle opening degree is converged to the target value for the throttle opening degree to establish the idling rotation. Therefore, with the conventional control system, the deformation, abrasion, or the like, of the full-close stopper 19 occurs due to the collision of the stopper engagement portion 8b with the full-close stopper 19. Also, the time required for the convergence to the idling engine speed is long.

On the other hand, according to the control system of this embodiment, as shown in FIG. 8, as the target throttle opening degree THCMD decreases, the rate of change in the throttle opening degree decreases. Accordingly, the problem of overshooting is resolved, and the stopper engagement portion 8b of the final-stage gear 8 does not collide with the full-close stopper 19. Therefore, with embodiments of the control system, the deformation, abrasion, or the like, of the full-close stopper 19 is less likely to occur, and the time required for the convergence to the idling engine speed can be made shorter.

Figure 10:
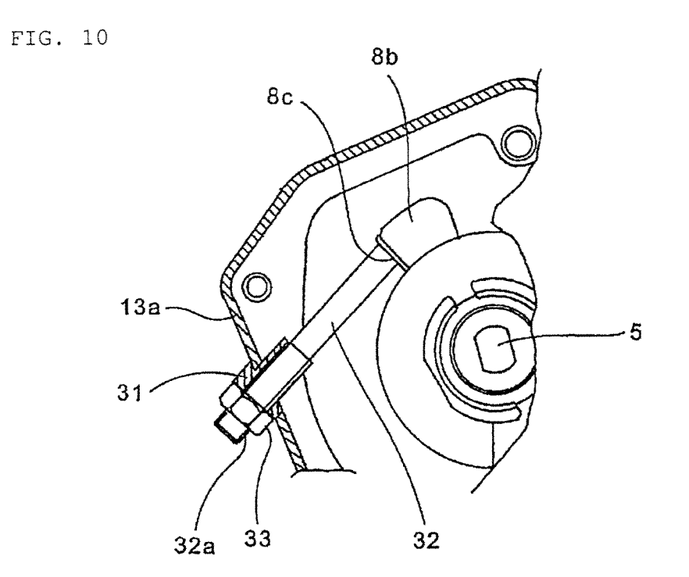
FIG. 10 is a cross-sectional view showing a main part of a full-close stopper according to another embodiment.

FIG. 10 is a cross-sectional view showing a main part of a full-close stopper according to another embodiment. Although the full-close stopper 19 shown in FIG. 3 is provided inside the case main body 13, a full-close stopper 19 in the embodiment shown in FIG. 10 is formed of a long rod and penetrates in a side wall of a case main body 13. In the example of FIG. 10, the full-close stopper 19 is held with a bush 31 penetrating through a side wall 13a of the case main body 13. The bush 31 has a screw thread formed in the inner periphery thereof. A rod 32 acting as the full-close stopper has one end portion formed in a screw 32a, and has the other end portion formed in a small-diameter portion having a diameter smaller than the outer diameter of the screw 32a. The rod 32 is screwed into the bush 31 in such a manner that the small-diameter portion is caused to protrude inside the case main body 13. The tip of the rod 32 is directed to a surface 8c of a stopper engagement portion 8b of a final-stage gear 8. The positional relationship of the rod 32 with the surface 8c of the stopper engagement position 8b at the fully closed state is set by adjusting how much the rod 32 is screwed into the bush 31. The position of the rod 32 is fixed by fastening a nut 33 onto the screw 32a in the one end portion of the rod 32.

Consider a case where the throttle valve is displaced in a closing direction, the target throttle opening degree is not more than the predetermined value, and the change amount of the target throttle opening degree is larger than the predetermined value (that is, a case where the rapid-closing operation of the throttle grip is detected). In this case, embodiments of the present invention can prevent the rapid closing of the throttle valve by making the change amount of the target throttle opening degree smaller than a normal change amount of the target throttle opening degree. With this configuration, it is possible to prevent a part of a throttle-valve driving member (a gear and the like for transmitting the rotation of the motor to the throttle valve) from colliding with the full-close stopper. This part of the throttle-valve driving member being designed to come into contact with the full-close stopper that defines the fully closed position of the throttle valve. In addition, since its control is executed only against such a rapid throttle operation that the throttle valve is caused to collide in the closing direction, the driveability is not impaired.

As a result, it is possible to suppress the throttle valve from overshooting with a repulsive force generated by the collision of the throttle-valve driving member with the full-close stopper, and also it is possible to reduce an occurrence of the deformation and abrasion of the full-close stopper and the throttle-valve driving member.

Then, suppressing the occurrence of overshooting makes it possible to promptly converge the throttle opening degree to the target opening degree for the idling rotation, and to thus ease up a free running feeling of a vehicle.

Note that, embodiments of the present invention make it possible to promptly converge the opening degree of the throttle valve to the idling opening degree, and thus enables a prompt return to idle driving.

DESCRIPTION OF REFERENCE NUMERALS

1 ... throttle body, 7 ... throttle valve, 8 ... final-stage gear, 10 ... motor, 19 ... full-close stopper, 21 ... throttle grip, 23 ... grip sensor, 24 ... ECU, 26 ... target TH opening degree change amount calculating unit, 27 ... collision prevention process determining unit, 28 ... change-amount basic value calculating unit, 29 ... correction term calculating unit, 30 ... multiplying unit

We claim:

1. A throttle control system for a throttle-by-wire (TBW) system,
the throttle control system comprising:
a target throttle opening degree change amount calculating unit configured to calculate a change amount of a target throttle opening degree,
wherein the target throttle opening degree is calculated in accordance with an operation opening degree of a throttle operating device, and a throttle valve is driven by a motor in accordance with the target throttle opening degree,
wherein the throttle operating device comprises a throttle grip on a steering handlebar of a motorcycle,
wherein the throttle control system is configured to perform a throttle valve control at a time of rapid closing operation of the throttle valve, the throttle valve being provided to a throttle body having a full-close stopper defining a fully closed position of the throttle valve,
wherein the target throttle opening degree change amount calculating unit is configured to calculate the change amount of the target throttle opening degree on the basis of a difference between a calculated value of the target throttle opening degree at the last time and a calculated value of the target throttle opening degree at this time when the throttle operating device is operated in such a direction that the throttle valve is closed,
wherein, when the target throttle opening degree is not more than a predetermined value and when the change amount of the target throttle opening degree becomes not less than a predetermined control start threshold, a limitation is provided on the change amount of the target throttle opening degree, so that the change amount of the target throttle opening degree is set to be smaller than a predetermined normal change amount of the target throttle opening degree, wherein the limitation made on the change amount of the target throttle opening degree is maintained until a time point when the change amount of the target throttle opening degree falls below a predetermined control termination threshold, wherein after a limitation process on the change amount of the target throttle opening degree is terminated, the change amount of the target throttle opening degree is converged to an idling opening degree, wherein the larger the target throttle opening degree, the larger a value the change amount is set to, and wherein the smaller the target throttle opening degree, the smaller a value the change amount is set to.

2. The throttle control system according to claim 1, wherein the limitation on the change amount of the target throttle opening degree is made using a correction term according to the target throttle opening degree, and a product of the correction term and a change-amount basic value of the target throttle opening degree is set as the change amount of the target throttle opening degree, so that the change amount of the target throttle opening degree is set to be lower than the normal change amount of the target throttle opening degree.

3. A method, comprising:

performing a throttle valve control at a time of rapid closing operation of the throttle valve, the throttle valve being provided to a throttle body having a full-close stopper defining a fully closed position of the throttle valve;

calculating a change amount of a target throttle opening degree, wherein the target throttle opening degree is calculated in accordance with an operation opening degree of a throttle operating device, and a throttle valve is driven by a motor in accordance with the target throttle opening degree, wherein the throttle operating device comprises a throttle grip on a steering handlebar of a motorcycle, wherein the calculating comprises calculating the change amount of the target throttle opening degree on the basis of a difference between a calculated value of the target throttle opening degree at the last time and a calculated value of the target throttle opening degree at this time when the throttle operating device is operated in such a direction that the throttle valve is closed; and when the target throttle opening degree is not more than a predetermined value and when the change amount of the target throttle opening degree becomes not less than a predetermined control start threshold, providing a limitation on the change amount of the target throttle opening degree, so that the change amount of the target throttle opening degree is set to be smaller than a predetermined normal change amount of the target throttle opening degree; and converging the change amount of the target throttle opening degree to an idling opening degree after a limitation process on the change amount of the target throttle opening degree is terminated, wherein the larger the target throttle opening degree, the larger a value the change amount is set to, and wherein the smaller the target throttle opening degree, the smaller a value the change amount is set to.

4. The method according to claim 3, wherein the limitation on the change amount of the target throttle opening degree is made using a correction term according to the target throttle opening degree, and the method further comprises setting a product of the correction term and a change-amount basic value of the target throttle opening degree as the change amount of the target throttle opening degree, so that the change amount of the target throttle opening degree is set to be lower than the normal change amount of the target throttle opening degree.

5. The method according to claim 3, further comprising maintaining the limitation made on the change amount of the target throttle opening degree until a time point when the change amount of the target throttle opening degree falls below a predetermined control termination threshold.

6. A throttle control system, comprising:

performing means for performing a throttle valve control at a time of rapid closing operation of the throttle valve, the throttle valve being provided to a throttle body having a full-close stopper defining a fully closed position of the throttle valve;

calculating means for calculating a change amount of a target throttle opening degree, wherein the target throttle opening degree is calculated in accordance with an operation opening degree of a throttle operating device, and a throttle valve is driven by a motor in accordance with the target throttle opening degree, wherein the throttle operating device comprises a throttle grip on a steering handlebar of a motorcycle, wherein the calculating means comprises means for calculating the change amount of the target throttle opening degree on the basis of a difference between a calculated value of the target throttle opening degree at the last time and a calculated value of the target throttle opening degree at this time when the throttle operating device is operated in such a direction that the throttle valve is closed; and when the target throttle opening degree is not more than a predetermined value and when the change amount of the target throttle opening degree becomes not less than a predetermined control start threshold, providing means for providing a limitation on the change amount of the target throttle opening degree, so that the change amount of the target throttle opening degree is set to be smaller than a predetermined normal change amount of the target throttle opening degree, wherein the limitation made on the change amount of the target throttle opening degree is maintained until a time point when the change amount of the target throttle opening degree falls below a predetermined control termination threshold, wherein after a limitation process on the change amount of the target throttle opening degree is terminated, the change amount of the target throttle opening degree is converged to an idling opening degree, wherein the larger the target throttle opening degree, the larger a value the change amount is set to, and wherein the smaller the target throttle opening degree, the smaller a value the change amount is set to.

7. A throttle control system, comprising:

a performing unit configured to perform a throttle valve control at a time of rapid closing operation of the throttle valve, the throttle valve being provided to a throttle body having a full-close stopper defining a fully closed position of the throttle valve;

a calculating unit configured to calculate a change amount of a target throttle opening degree, wherein the target throttle opening degree is calculated in accordance with an operation opening degree of a throttle operating device, and a throttle valve is driven by a motor in accordance with the target throttle opening degree, wherein the throttle operating device comprises a throttle grip on a steering handlebar of a motorcycle, wherein the calculating unit is further configured to calculate the change amount of the target throttle opening degree on the basis of a difference between a calculated value of the target throttle opening degree at the last time and a calculated value of the target throttle opening degree at this time when the throttle operating device is operated in such a direction that the throttle valve is closed; and when the target throttle opening degree is not more than a predetermined value and when the change amount of the target throttle opening degree becomes not less than a predetermined control start threshold, a providing unit is configured to provide a limitation on the change amount of the target throttle opening degree, so that the change amount of the target throttle opening degree is set to be smaller than a predetermined normal change amount of the target throttle opening degree, wherein the limitation made on the change amount of the target throttle opening degree is maintained until a time point when the change amount of the target throttle opening degree falls below a predetermined control termination threshold, wherein after a limitation process on the change amount of the target throttle opening degree is terminated, the change amount of the target throttle opening degree is converged to an idling opening degree, wherein the larger the target throttle opening degree, the larger a value the change amount is set to, and wherein the smaller the target throttle opening degree, the smaller a value the change amount is set to.

8. The throttle control system according to claim 7, wherein the limitation on the change amount of the target throttle opening degree is made using a correction term according to the target throttle opening degree, and a product of the correction term and a change-amount basic value of the target throttle opening degree is set as the change amount of the target throttle opening degree, so that the change amount of the target throttle opening degree is set to be lower than the normal change amount of the target throttle opening degree.

* * * * *